(12) United States Patent
Merchant

(10) Patent No.: US 7,926,828 B2
(45) Date of Patent: Apr. 19, 2011

(54) RIDING APPARATUS FOR DISABLED PERSONS AND KIT FOR MAKING SAME

(76) Inventor: Pamela J. Merchant, Bonny Doon, CA (US)

( * ) Notice: Subject to any disclaimer, the term of this patent is extended or adjusted under 35 U.S.C. 154(b) by 232 days.

(21) Appl. No.: 11/980,885

(22) Filed: Oct. 30, 2007

(65) Prior Publication Data

US 2009/0108559 A1     Apr. 30, 2009

(51) Int. Cl.
*B62K 21/10*     (2006.01)
(52) U.S. Cl. .......................................... 280/282
(58) Field of Classification Search ................... 280/282; 384/273
See application file for complete search history.

(56) References Cited

U.S. PATENT DOCUMENTS

| | | | | | |
|---|---|---|---|---|---|
| 4,456,277 | A | * | 6/1984 | Carpenter | 280/282 |
| 4,623,954 | A | * | 11/1986 | Schott et al. | 362/474 |
| 5,008,782 | A | * | 4/1991 | Murray | 362/474 |
| 6,378,882 | B1 | * | 4/2002 | Devine | 280/234 |
| 6,805,473 | B2 | * | 10/2004 | Beard | 362/474 |
| 6,932,370 | B2 | * | 8/2005 | Jones et al. | 280/282 |
| 7,000,935 | B2 | * | 2/2006 | Gunter et al. | 280/272 |
| 7,281,725 | B1 | * | 10/2007 | Gunter et al. | 280/272 |

* cited by examiner

*Primary Examiner* — Kevin Hurley
(74) *Attorney, Agent, or Firm* — Michael A. Guth

(57) ABSTRACT

A tricycle adapted for use by children with autistic spectral disorder. A tricycle with toe clips, hand grips, seat belt, and adjustable handlebars and seat adapted for use by a child with autistic spectrum disorder. A tricycle with other distracting items to help lure use by a child with autistic spectrum disorder. A kit for the adaptation of a tricycle for use by children, and more specifically for use by children with autism.

7 Claims, 6 Drawing Sheets

RIDING APPARATUS FOR DISABLED PERSONS AND KIT FOR MAKING SAME

BACKGROUND

1. Field of the Invention

This invention relates to a vehicle for use by persons with disabilities, and more specifically a tricycle for use by children with autistic spectrum disorder (ASD).

2. Description of Related Art

Autism is a neurological disorder. Children with ASD have severe communication and language delays, sensory processing abnormalities, difficulty acquiring self-help skills, and experience delayed social interaction. Autism is a developmental disorder affecting critical aspects of a child's interaction with the external world. Defining characteristics include a significant impairment in social skills, a significant impairment in the ability to use words to communicate and lack of appropriate cognitive and behavioral flexibility, often manifested as preservative behavior or poor impulse control. There is no typical autistic child. Autism is known as a spectrum disorder because there is a wide range of characteristics and severity. However, all children with autistic spectrum disorder have common deficits in social and language skills seen from early childhood and restricted patterns of behavior.

ASD has reached epidemic proportions, not only in the United States but in many countries throughout the world. The Center for Disease Control (CDC) has documented that ASD occurs in 1 in 500 children. Moreover, the syndrome is found more in males than in females, at a ration of about 4 to 1. In the last ten years there has been an alarming increase in the number of children diagnosed with autism. The reason for this rise in ASD is unknown.

Children with autism have difficulties keeping there bodies in good physical condition. Children with autism may possess low levels of physical fitness (Auxter, Pyfer, & Huettig, 1997). This can be compounded by the fact that this population tends to have lower levels of interest or motivation to participate in games. Physical activity programs for children with autism may promote appropriate behaviors and improve cardiovascular endurance at the same time. Following moderate aerobic activity, children with autism may experience increases in attention span, on-task behavior, and level of correct responding. Thus, any device that exercises the muscles which can be used by children with ASD may be of enormous benefit. A device for such use must meet, at a minimum, two needs: first, that it be usable by children with ASD, and second, that be attractive enough to lure such children into using it. Children with ASD are difficult, if not impossible, to force into a situation.

Unfortunately, there are not sufficient devices available to meet the needs of children with autism. Although some devices have been designed, they are typically very expensive, which restricts their availability. Some items are stationary exercise devices for use as the child matures.

What is clearly called for is a device which affords a child with ASD an opportunity for exercise. What is also called for is such a device which is adapted to be used by a child with ASD, and also to be attractive enough to such a child to solicit the device's use. The device should also be affordable.

SUMMARY

A tricycle adapted for use by children with autistic spectrum disorder. A tricycle with toe clips, hand grips, seat belt, and adjustable handlebars and seat adapted for use by a child with autistic spectrum disorder. A tricycle with other distracting items to help lure use by a child with autistic spectrum disorder. A kit for the adaptation of a tricycle for use by children, and more specifically for use by children with autism.

DETAILED DESCRIPTION

Illustrated in the accompanying figures is an improved tricycle with an improved steering and seating mechanism, and other improvements, for use typically by children with autistic spectral disorder. In certain embodiments, the tricycle provides a steering mechanism which is easier, more comfortable, better for the posture, more motivating, and which may be safer for such a child to use.

Figure 1:
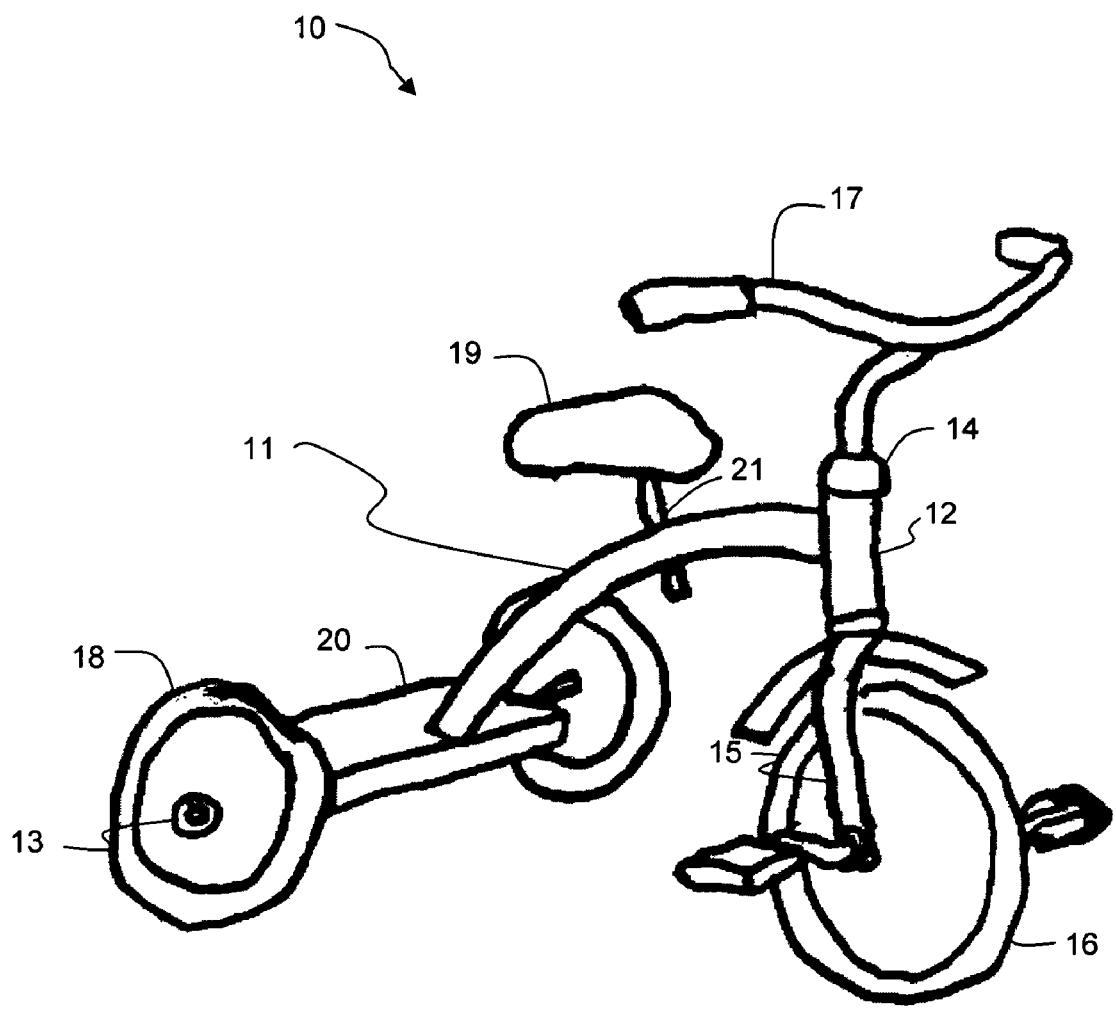
FIG. 1 is a picture of a typical children's tricycle.

Referring to FIG. 1, a tricycle 10 in accordance with past practice generally comprises a frame 11 including a head tube 12 at a front end thereof and an axle 13 at a rear end thereof. A handlebar stem 14 is extended through the head tube 12 and pivotable relative to the head tube 12. A front fork 15 is formed on a lower end of the handlebar stem 14, and a front wheel 16 is rotatably mounted to the front fork 15. A handlebar 17 is attached to the upper end of the handlebar stem 14 to turn therewith, thereby controlling the moving direction of the tricycle. Rear wheels 18 are rotatably mounted to the axle 13.

A seat 19 is attached to a seat post 21 mounted to the frame 11. The seat 19 may be able to be raised and lowered by adjustment through the frame 11. A rear pedestal 20 is seen over the axle 13. The rear pedestal 20 allows for a child to stand with one foot on the pedestal while propelling the tricycle forward by pushing with the other foot, while having its hands on the handlebars. Normal locomotion is achieved when the child sits on the seat 19 with feet on the pedals 22 and pushes down on the pedals, rotating the front wheel 16, and propelling the tricycle 10 forward.

FIGS. 2-6 illustrate aspects of a tricycle according to some embodiments of the present invention. The various components and aspects described below may be used singly, in various combinations, or in total combination.

Figure 2:
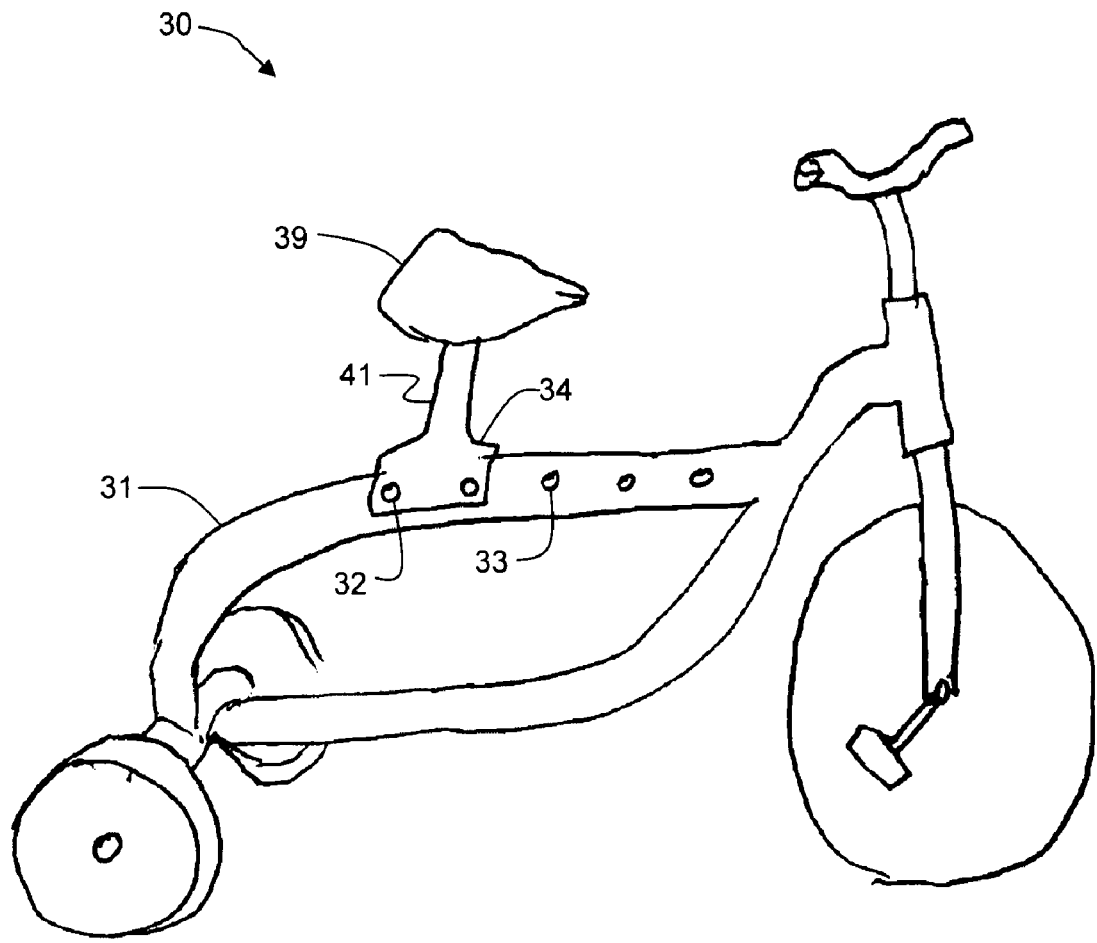
FIG. 2 is a sketch of a tricycle according to some embodiments of the present invention.

In some embodiments of the present invention, as seen in FIG. 2, a tricycle 30 has a seat 39 capable of being adjusted to allow for better fitting, and better posture of the user. Along the frame 31 are a plurality of mounting holes 33 adapted to allow for the placement of the seat 39 at a variety of different positions along the frame 31. The seat 39 may have a seat tube 41 with a mounting portion 34 adapted to mount to holes 32 in the frame 31. Although the holes 32 are shown as horizontal with the mounting portion 34 shown as a clamshell, other types of variable attachment may be used. For example, the holes may be vertically through the frame, allowing for both lateral and vertical adjustment of the seat location.

Of importance with the use of the tricycle by children with autistic spectral disorder is the ability of the tricycle to be fitted to the child. As mentioned above, such children often do not have the level of fitness that other children may have, and for them the posture that they assume when using the tricycle is of more importance to allow more reliance on skeletal features.

Figure 3:
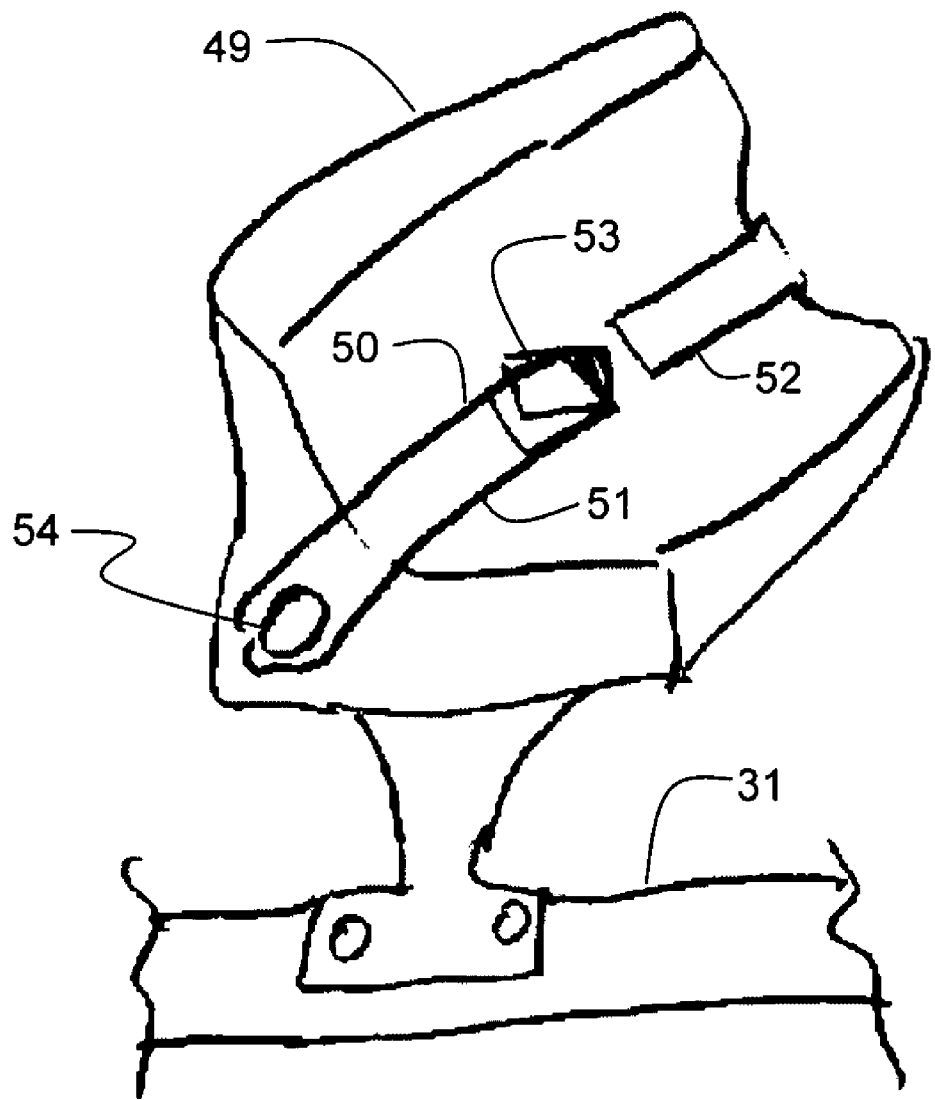
FIG. 3 is a sketch of a seat with seat belt for a tricycle according to some embodiments of the present invention.

In some embodiments of the present invention, as seen in FIG. 3, as tricycle seat 49 has a seat belt 50 adapted to hold the user in place in the seat 49. The seat belt 50 may have a first belt section 51 attached to the seat 49 at a first attach point 54. The second belt section 52 is attached to the seat 49 at a second attach point. A buckle 53 may be used to attach the first belt section 51 to the second belt section 52 around the waist of a user. In some embodiments, the belt sections may be able to pivotally rotate around the attach points. In some embodiments, the belt may be of a longer single section routed around or through the seat and back around to attach to its other end.

The use of a seat belt allows for the more secure attachment of the child to the tricycle. In the case of autistic children, it allows a child that may be in poor physical condition to be held in the seat. In the case of autistic children, it also offers the advantage of clearly demonstrating to the child that the child is supposed to be in that spot, which may be an important aspect in many cases.

Figure 4:
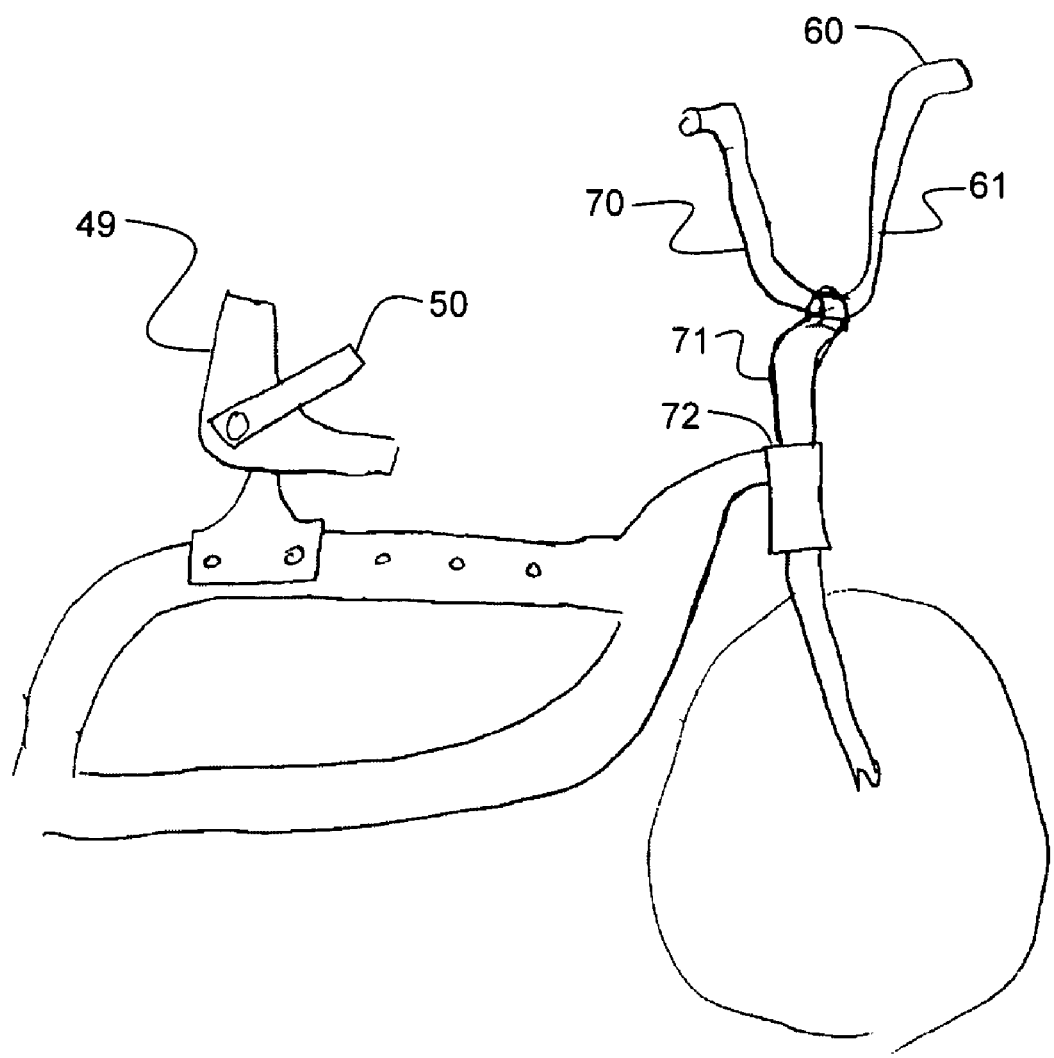
FIG. 4 is a partial side view of a tricycle according to some embodiments of the present invention.

FIG. 4 illustrates another posture related aspect of the present invention. The handlebar assembly 70 is shown with a handlebar 60 attached to a neck 71. The neck 71 is attached to the upper end 72 of the front fork. The handlebar 60 and the neck 71 may be of one piece or of several pieces in some embodiments. The handlebar assembly is adapted to steer the front wheel of the tricycle.

As seen in FIG. 4, the handlebar 60 has an extended rise 61 resulting in the hand grip area to be higher relative to the seat 49 than in a typical tricycle. This raised handlebar, along with the ability of the user to position the seat, allows a user to set the relative position of seat and handlebar to position of posture superior for a weaker child, as may be the case of a child with autistic spectrum order.

Figure 5:
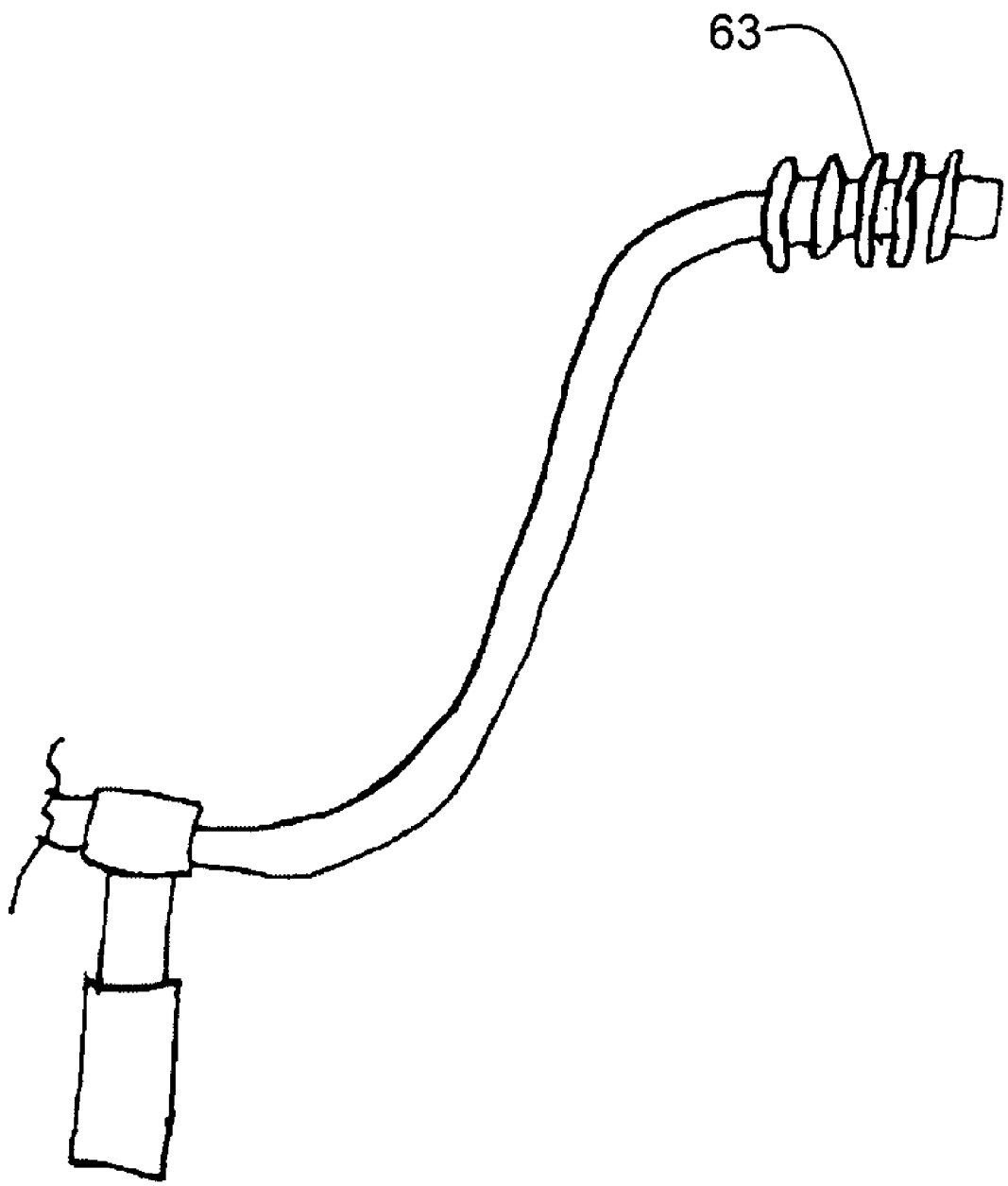
FIG. 5 is a view of a handlebar and handgrip according to some embodiments of the present invention.
Figure 6:
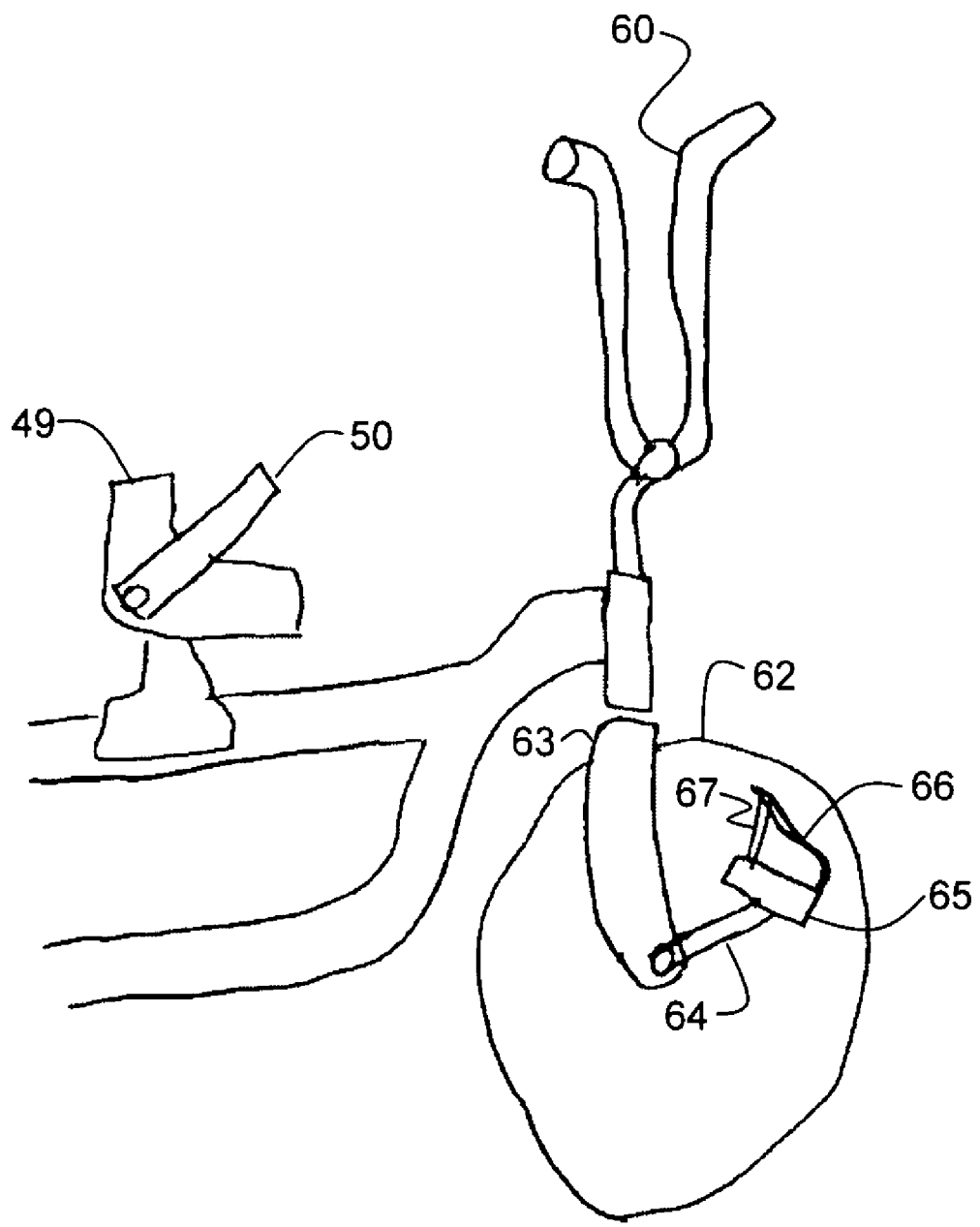
FIG. 6 is a side view of a tricycle according to some embodiments of the present invention.

FIGS. 5 and 6 illustrate two other improvements which help "place" a child onto the tricycle. In some embodiments of the present invention, as seen in FIG. 5, a formed handgrip 63 is seen with ridges placed in the areas between where the fingers would be placed, and valleys adapted to receive and hold the fingers in place. Children with autism often perform better in physical situations wherein their placement is dictated, and thus the formed handgrip 63 meets that objective with regard to their hands.

In some embodiments of the present invention, as seen in FIG. 6, a tricycle with a seat 49 that has a seat belt 50, and a raised handlebar 60 which may also have formed handgrips, has an additional feature adapted to be used by children with autistic spectral disorder. The front fork 63 is rotatably fixed to a front section of the frame body of the frame of the tricycle. A front wheel 62 is rotatably mounted to the front fork 63. The method of propulsion of the tricycle involves alternating force on the pedals 65 of the tricycle. The force is relayed from the pedals 65 to the front wheel 62 of the tricycle via crank arms 64 attached to the front wheel 62.

In some embodiments of the present invention, the pedals 62 of the tricycle utilize toe clips 66 adapted to hold and constrain the feet of the user. The toe clips 66 may also use a strap 67 which allows for a cinching of the strap and clip to the foot of the user. In conjunction with a seat utilizing a seat belt, which constrains the user's ability to move off of the seat, and the pedals 62 with toe clips 66 and straps 67, the tricycle is now adapted for use by a child who may otherwise not be inclined to remain in the proper position for use of the tricycle, as may be the case with an autistic child. Combined with the formed handgrips, the aforementioned features address all portions of the child which interact with the tricycle and make it clear to such a child how the child should be positioned on the tricycle. Also, in conjunction with a seat with adjustable positioning, allowing for proper placement and posture of the child, the tricycle is adapted for use by a child with autism as described above.

Another aspect of improvement of the tricycle for use with children who have autistic spectral disorder is one which makes the tricycle more alluring to the child, entices the child both to mount the tricycle in a first instance, and then to remain on the tricycle in the second instance. The earlier discussed toe clips and seat belt are not intended so much to retain the child as a prisoner on the tricycle as to make it clear to the child where the child should remain, an important aspect with some children with autism. An improvement geared more towards enticing the child to be drawn to, and to stay on, the tricycle is the placement of a flashing light on the tricycle, such as on the handlebars. The light may be placed such that the flashing light is directed towards the user when the user in sitting on the tricycle.

In some embodiments of the present invention, a kit of components that allows for the retrofit of a tricycle to allow for better use by a child with autistic spectral disorder. The kit may comprise one or more of the following components. In some embodiments, a seat belt adapted to be used with a tricycle seat. The seat belt may be adapted to wrap around the bottom rear of the seat and over the lap of the user. In some embodiments, seat with seat belt adapted to replace the original seat of the tricycle. In some embodiments, front wheel pedals with toe clips, and in some embodiments, straps for the toe clips. In some embodiments, pedals with toe clips are provided and are adapted to replace the pedals of the unaltered tricycle. In some embodiments, toe clips which are adapted to be fitted to the existing pedals of the tricycle. In some embodiments, a replacement handlebar of higher height than a typical tricycle handlebar. In some embodiments, formed hand grips adapted to be placed on the ends of the handlebar of the tricycle. In some embodiments, a flashing light to be mounted onto the tricycle, such as on the handlebar. In some embodiments, a bell to be mounted of the tricycle, such as on the handlebar.

A method for the improvement or maintenance of the fitness of a child with a disability includes having a child ride, and work with, a tricycle according to some embodiments of the present invention.

Although the benefits of this invention have been described as being specifically advantageous for children with autism, other children with other disabilities may also benefit from this invention. For example, a child with a disability which impairs walking, such as from low muscle tone, may be able to utilize a tricycle according to some embodiments of the present invention and receive tremendous benefit therefrom.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A tricycle adapted for use by children with autistic spectrum disorder, said tricycle comprising:
- a frame having a frame body;
- a front fork rotatably fixed to a front section of said frame body;
- a front wheel rotatably mounted to said front fork;
- two crank arms attached to said front wheel;
- two pedals rotatably mounted respectively on said two crank arms;
- a handlebar assembly attached to an upper end of said front fork;
- two toe clips, said toe clips attached to said pedals, said toe clips adapted to clip over the feet of a user;
- two rear wheels rotatably mounted to the rear portion of said frame; and
- a seat, said seat attached to said frame body, said seat comprising a seat belt.

2. The tricycle of claim 1 further comprising toe clip straps.

3. The tricycle of claim 1 further comprising two formed hand grips, said formed hand grips attached to the outboard ends of said handlebar assembly.

4. The tricycle of claim 1 wherein said seat is adjustable from a first position closer to said handlebar assembly to a second position further from said handlebar assembly.

5. The tricycle of claim 3 wherein said seat is adjustable from a first position closer to said handlebar assembly to a second position further from said handlebar assembly.

6. The tricycle of claim 1 further comprising a flashing light, said flashing light attached to said handlebar assembly.

7. The tricycle of claim 3 further comprising a flashing light, said flashing light attached to said handlebar assembly.

* * * * *